May 10, 1932.   D. ELDER   1,857,627
HOSE TIMER
Filed Feb. 24, 1930
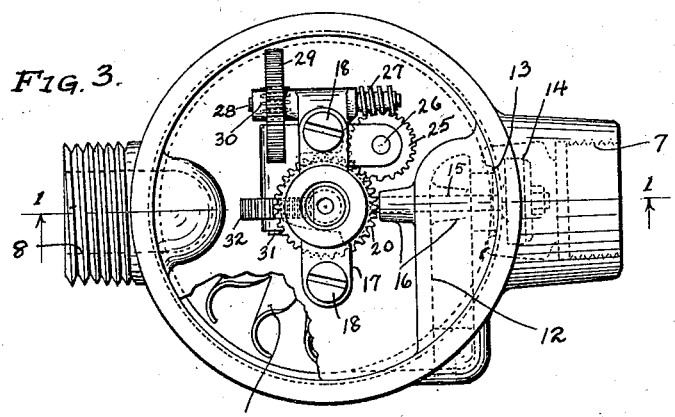
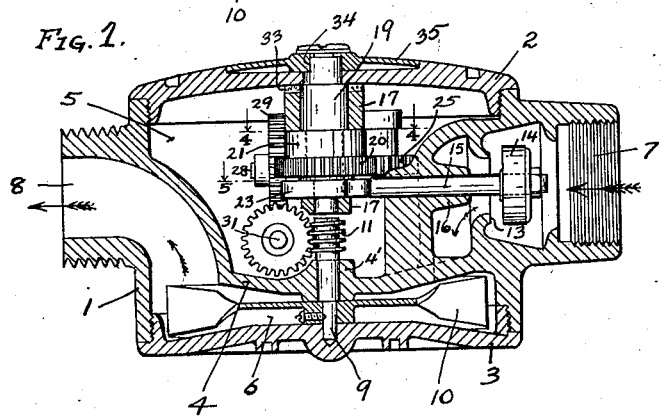
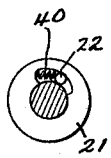
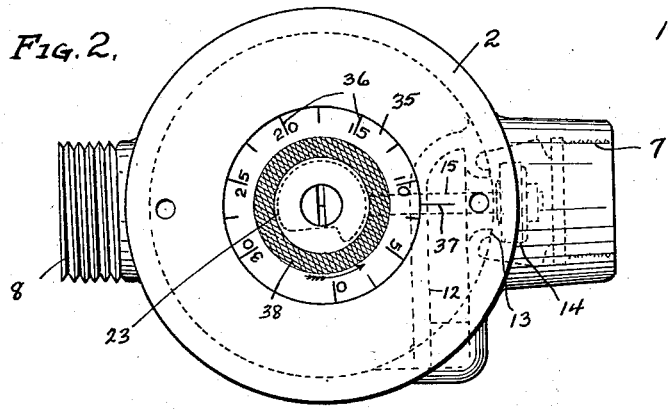
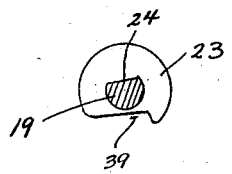
INVENTOR.
DONALD ELDER.
BY Miller Boyken & Bries
ATTORNEYS.

Patented May 10, 1932

1,857,627

UNITED STATES PATENT OFFICE

DONALD ELDER, OF BERKELEY, CALIFORNIA

HOSE TIMER

Application filed February 24, 1930. Serial No. 430,755.

This invention relates to liquid flow timing apparatus and has for its principal object an automatic water flow timing valve adapted for use in connection with a garden hose so that the time of watering of the garden may be predetermined.

Another object of the invention is to provide a simple and cheap construction in such a device, compact in its form and which may easily be set to hold the flow of water open over a wide range of time. Other objects will appear in the following specification and accompanying drawings.

In the drawings Fig. 1 is a vertical central section through my hose timer showing the inlet and outlet passages for water, the closing valve and the control mechanism operated by the water flow.

Fig. 2 is a plan view of the device showing the manually adjustable timing dial.

Fig. 3 is a plan view with the upper screw cover removed and a portion of the wall of the turbine chamber broken away to reveal the wheel therein.

Fig. 4 is a detached plan view of the roller clutch gear hub as seen from the line 4—4 of Fig. 1.

Fig. 5 is a detached plan view of the valve lifting cam as seen from the line 5—5 of Fig. 1.

Generally described, the invention comprises a circular casing having a main chamber for housing the timing mechanism, a secondary chamber housing a water wheel which operates the mechanism, inlet and outlet passageways leading water to and from the water wheel chamber, a valve for closing off the inlet passegeway controlled by the timing mechanism and a manually operated device or dial at the outside of the casing for setting the timing mechanism.

In the drawings the casing 1 is provided with screw cover 2 and screw bottom plate 3 for accessibility of the interior, and a transversely extending wall 4 separating the interior into the two chambers 5 and 6 for the mechanism and wheel respectively.

The inlet passageway is shown at 7 and the outlet at 8 both suitably threaded for screwing to a faucet and hose connection respectively.

Axially positioned in the casing and having bearing in the bottom plate as well as in a boss 4' formed on the chamber separating wall is a shaft 9 to the lower portion of which is secured a tangential type water wheel 10 and on the upper end a worm 11.

The body of the casing is so ported as indicated at 12 that the water from inlet 7 must pass over one side of the wheel 10 on its way to outlet 8, and a valve seat 13 is formed in the inlet passageway upon which a valve 14 is adapted to seat. The valve 14 is provided with a guiding stem 15 slidably supported in a boss 16 formed on the wall of port 12.

The timing gearing is housed within chamber 5 and mounted on a removable frame 17 secured to the bottom wall 4 by screws as at 18, and comprises a central vertical revolvable shaft 19 aligned over shaft 9 having a bearing in the frame 17 as well as passing through the cover 2, a clutch gear 20 provided with a hub 21 containing a small roller clutch 22 is mounted on the shaft so that the shaft is free to turn in one direction without revolving the gear, while just below the clutch gear is a rim cam 23 secured by a flat spot 24 so as to turn with the shaft, and the cam so positioned that its edge bears against the end of the valve stem to lift the same as the cam is revolved.

Meshing with gear 20 is a gear 25 carried on a vertical shaft 26, and meshing gear 25 is a worm 27 carried on a horizontal shaft 28 to the opposite end of which is a gear 29 engaged below by a worm 30 carried on a horizontal shaft 31 to the other end of which is secured a gear 32 engaged by worm 11 of the water wheel shaft, thus giving a three worm gear reduction from the water wheel to the cam chaft 19.

Shaft 19 is provided with a felt or other packing washer at 33 to prevent leakage of water where it passes through the cover 2, and above the cover the shaft has a flat side engaging the hub 34 of a disk 35 which is loosely seated in a recess in the cover.

Disk 35 is for revolving with the fingers to turn the cam 23 and lift the valve 14 from its seat to start the flow and revolution of the water wheel, and also to determine the length of time the flow shall continue, as denoted by the graduations in minutes 36 around the edge of the plate which may be selectively brought to register with a line 37 on the cover. The disk is preferably knurled as at 38 or otherwise provided with means for easy gripping with the fingers.

In operation of my hose timer, when the valve is closed its stem is free of the cam in the cut-away portion 39 and when turned to make figure 30 register with mark 37 the cam has lifted the valve, the flow and water wheel start, and the revolving clutch gear 20 grips the cam shaft and very slowly carries it around in the same direction in which it was first turned manually until the valve stem falls into the cut-away part of the cam when the water automatically shuts off.

If the cam shaft were turned by hand almost all the way around, or until the valve stem was about ready to again fall into the cut-away part of the cam, it follows that the duration of flow would be very short.

The adjusting disk may be made to operate in either direction for setting, depending on whether the worms and clutch being right or left-handed.

The clutch shown is of the roller variety with a small spring 40 to urge the roller along the inclined slot in the clutch hub, but it is evident that any kind of a ratchet clutch may be used to accomplish the same result.

It will be noted that no valve closing spring is shown, as I have found the water pressure acting against the valve to be sufficient to automatically close the valve without the further aid of a spring.

I claim:

1. A water flow timing device comprising a chambered casing provided with a water inlet and outlet passage, a valve for the passage closed by the water pressure, a rotatable shaft provided with a cam for opening said valve, the end of said shaft projecting from the casing and provided with means for manually revolving the shaft, a water wheel in the water passage operated by the flow therethrough, and timing gearing connecting the shaft with said water wheel for revolving the cam to permit closing of the valve.

2. A water flow timing device comprising a chambered casing provided with a water inlet and outlet passage, a valve for the passage closed by the water pressure, a rotatable shaft provided with a cam for opening said valve, the end of said shaft projecting from the casing and provided with means for manually revolving the shaft, a water wheel in the water passage operated by the flow therethrough, and timing gearing connecting the shaft with said water wheel for revolving the cam to permit closing of the valve, the arrangement being such that the cam may be manually turned to various degrees of a revolution to thereby determine the duration of flow.

3. A water flow timing device comprising a chambered casing provided with a water inlet and outlet passage, a valve for the passage closed by the water pressure, a rotatable shaft provided with a cam for opening said valve, the end of said shaft projecting from the casing and a disk on the end of and for manually revolving the shaft, a water wheel in the water passage operated by the flow therethrough, and timing gearing connecting the shaft with said water wheel for revolving the cam to permit closing of the valve.

4. A water flow timing device comprising a chambered casing provided with a water inlet and outlet passage, a valve for the passage closed by the water pressure, a rotatable shaft provided with a cam for opening said valve, the end of said shaft projecting from the casing and a disk on the end of and for manually revolving the shaft, a water wheel in the water passage operated by the flow therethrough, and timing gearing connecting the shaft with said water wheel for revolving the cam to permit closing of the valve, said disk graduated with figures denoting the angular setting of the cam and consequent duration of flow through said setting.

5. A water flow timing device comprising a substantially round box with a water passage in the box having an inlet and an outlet at opposite edges thereof, a partition in the box forming a chamber therein separate from the water passage, a water-wheel in the water passage, a shaft on said water-wheel substantially concentrically disposed in said box and passing through said partition to the chamber, reduction gearing in said chamber connecting the water-wheel shaft and having a slow speed shaft extending substantially axially out of the side of the box remote from said water-wheel, a cam on said slow speed shaft, a valve on said water passage and provided with a stem impinging said cam whereby upon revolution of the cam the valve may be opened, and means whereby said slow speed shaft may be turned free of said reduction gearing for setting said cam.

DONALD ELDER.